(12) United States Patent
Short

(10) Patent No.: US 7,440,570 B2
(45) Date of Patent: *Oct. 21, 2008

(54) METHOD AND APPARATUS FOR REMOTE DIGITAL KEY GENERATION

(75) Inventor: Kevin M. Short, Durham, NH (US)

(73) Assignee: Groove Mobile, Inc., Hampton Falls, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/654,997

(22) Filed: Jan. 16, 2007

(65) Prior Publication Data

US 2007/0177730 A1    Aug. 2, 2007

Related U.S. Application Data

(63) Continuation of application No. 10/099,812, filed on Mar. 18, 2002, now Pat. No. 7,215,772, which is a continuation-in-part of application No. 09/436,910, filed on Nov. 9, 1999, now Pat. No. 6,363,153.

(51) Int. Cl.
*H04L 9/12* (2006.01)
*H04L 9/14* (2006.01)
*H04L 9/34* (2006.01)

(52) U.S. Cl. .................... 380/44; 380/42; 380/44; 380/255; 380/259; 380/260; 380/263; 380/277

(58) Field of Classification Search .............. None
See application file for complete search history.

(56) References Cited

U.S. PATENT DOCUMENTS

| | | | |
|---|---|---|---|
| 4,941,193 A | 7/1990 | Barnsley et al. | |
| 5,040,217 A | 8/1991 | Brandenburg et al. | |
| 5,048,086 A | 9/1991 | Bianco | |
| 5,245,660 A | 9/1993 | Pecora et al. | |
| 5,291,555 A | 3/1994 | Cuomo et al. | |
| 5,347,600 A | 9/1994 | Barnsley et al. | |
| 5,365,589 A | 11/1994 | Gutowitz | |
| 5,416,848 A | 5/1995 | Young | |
| 5,432,697 A | 7/1995 | Hayes | |

(Continued)

FOREIGN PATENT DOCUMENTS

JP    04-097197    3/1992

(Continued)

OTHER PUBLICATIONS

Degazio, "Towards a Chaotic Musical Instrument," ICMC Proceedings, pp. 393-395, (1993).

(Continued)

*Primary Examiner*—Syed A. Zia
(74) *Attorney, Agent, or Firm*—Ropes & Gray LLP

(57) ABSTRACT

A method and apparatus that uses tha dynamics of chaotic system for the remote generation of a digital key, for use in any encryption algorithm. After initialization, the dynamics of a chaotic system are allowed to generate the 0 and 1 bits of a key bistream. An initialization bistream is transmitted, using conventional transmission technologies, to an identical chaotic system. This chaotic system is driven into synchrony and allow to generate a key bitsream, which is identical to the other bitstream because the chaotic systems have been sychronized.

14 Claims, 4 Drawing Sheets

U.S. PATENT DOCUMENTS

| | | | |
|---|---|---|---|
| 5,473,694 | A | 12/1995 | Carroll et al. |
| 5,479,512 | A | 12/1995 | Weiss |
| 5,508,473 | A | 4/1996 | Chafe |
| 5,592,555 | A | 1/1997 | Stewart |
| 5,606,144 | A | 2/1997 | Dabby |
| 5,661,788 | A | 8/1997 | Chin et al. |
| 5,680,462 | A | 10/1997 | Miller |
| 5,729,607 | A | 3/1998 | DeFries et al. |
| 5,737,360 | A | 4/1998 | Grinstein et al. |
| 5,768,437 | A | 6/1998 | Monro et al. |
| 5,774,385 | A | 6/1998 | Bristol |
| 5,808,225 | A | 9/1998 | Corwin et al. |
| 5,818,712 | A | 10/1998 | Glenn, Sr. |
| 5,838,832 | A | 11/1998 | Barnsley |
| 5,857,025 | A | 1/1999 | Anderson |
| 5,857,165 | A | 1/1999 | Coron et al. |
| 5,923,760 | A | 7/1999 | Abarbanel et al. |
| 6,137,045 | A | 10/2000 | Short et al. |
| 6,178,217 | B1 | 1/2001 | DeFries et al. |
| 6,208,951 | B1 | 3/2001 | Kumar et al. |
| 6,212,239 | B1 | 4/2001 | Hayes |
| 6,249,810 | B1 | 6/2001 | Kiraly |
| 6,275,615 | B1 | 8/2001 | Ida et al. |
| 6,363,153 | B1 | 3/2002 | Parker et al. |
| 6,374,177 | B1 | 4/2002 | Lee et al. |
| 6,389,463 | B2 | 5/2002 | Bolas et al. |
| 6,418,138 | B1 | 7/2002 | Cerf et al. |
| 6,546,427 | B1 | 4/2003 | Ehrlich |
| 6,577,716 | B1 | 6/2003 | Minter et al. |
| 6,581,103 | B1 | 6/2003 | Dengler |
| 6,587,563 | B1 * | 7/2003 | Crandall ................. 380/263 |
| 6,631,166 | B1 | 10/2003 | Carroll |
| 6,678,215 | B1 | 1/2004 | Treyz et al. |
| 6,725,022 | B1 | 4/2004 | Clayton et al. |
| 6,744,893 | B1 | 6/2004 | Fleming-Dahl |
| 6,799,201 | B1 | 9/2004 | Lee et al. |
| 6,829,475 | B1 | 12/2004 | Lee et al. |
| 6,980,656 | B1 | 12/2005 | Hinton, Sr. et al. |
| 7,170,997 | B2 * | 1/2007 | Petersen et al. ............ 380/268 |
| 7,174,019 | B2 * | 2/2007 | Okutomi .................. 380/263 |
| 2001/0037240 | A1 | 11/2001 | Marks et al. |
| 2001/0042109 | A1 | 11/2001 | Bolas et al. |
| 2002/0001381 | A1 | 1/2002 | Mori |
| 2002/0046084 | A1 | 4/2002 | Steele et al. |
| 2002/0059592 | A1 | 5/2002 | Kiraly |
| 2002/0091790 | A1 | 7/2002 | Cubley |
| 2002/0154770 | A1 | 10/2002 | Short |
| 2002/0164032 | A1 | 11/2002 | Short |
| 2004/0039796 | A1 | 2/2004 | Watkins |
| 2004/0143349 | A1 | 7/2004 | Roberts et al. |

FOREIGN PATENT DOCUMENTS

| | | |
|---|---|---|
| JP | 06-089106 | 3/1994 |
| JP | 07-084580 | 3/1995 |
| JP | 07-140983 | 6/1995 |
| JP | 10-143162 | 5/1998 |
| JP | 09-218683 | 8/1998 |
| JP | 11-219185 | 8/1999 |
| WO | WO 99/42990 | 8/1999 |
| WO | WO 01/31839 | 5/2001 |
| WO | WO 02/065386 | 8/2002 |
| WO | WO-03/003235 A1 | 1/2003 |

OTHER PUBLICATIONS

"Cubic Oscillator Explorer v0.51," http://web.archive.org/web/20010211000709/www-ks.rus.uni-stuttgart.de/people/sch. . ., (Oct. 20, 2005).

Dedieu et al., "Signal Coding and Compression Based on Chaos Control Techniques," IEEE, 1995, pp. 1191-1194, XP002325883.

Alvarez, et. al, "Chaotic Cryptosystems," Institute of Electrical and Electronics Engineers, Proc. 33rd Annual 1999 International Carnahan Conference on Security Technology. (ICCST) Madrid, Spain, Oct. 5-7, 1999, IEEE, US, vol. Conf 33, Oct. 5, 1999 (Oct. 05, 1999), pp. 332-338, XP001003771, ISBN: 0-7803-5248-3.

Carroll et. al., "Synchronizing Chaotic Systems", SPIE Chaos in Communications 32-43, 1993.*

Cuomo et. al., "Synchronization of Lorenz-Based Chaotic Circuits with Applications to Communications", IEEE Transactions on Circuits and Systems, 626-633, 1993.

Lai, "Synchronization of a Chaotic Optical System Using Control", SPIE Chaos in Communication, pp. 91-102, 1993.

Newell, et al., "Synchronization of Chaos Using Proportional Feedback," SPIE Chaos in Communications, 1993, pp. 115-130.

Yang et al., "Secure Communication via Chaotic Parameter Modulation", IEEE Transactions on Circuits and System 817-819, 1996.

Short, K., "Steps Towards Unmasking Secure Communications," International Journal of Bifurcation and Chaos, vol. 4, No. 4, 1994, pp. 959-977.

Hayes, S., Grebogi, C., and Ott, E., "Communicationg with Chaos", Phys. Rev. Lett., 70, 3031, 1993.

Yang, Tao, "A Survey of Chaotic Secure Communication Systems", International Journal of Computational Cognition, vol. 2., No. 2, pp. 81-130, Jun. 2004. (http://www.YangSky.com/yangijcc.htm).

Hunt, E. R., "Stabilizing High-Period Orbits in a Chaotic System: The Diode Resonator", Physical Review Letters, vol. 67, No. 15, pp. 1953-1957, Oct. 7, 1991.

Non-final office action issued by Examiner James Seal on Apr. 2, 2000, in the prosecution of U.S. Appl. No. 09/436,910, now issued as Patent No.6,363,153 (Method and apparatus for secure digital chaotic communication).

Final office action issued by Examiner James Seal on Dec. 21, 2000, in the prosecution of U.S. Appl. No. 09/436,910, now issued as U.S. Patent No. 6,363,153 (Method and apparatus for secure digital chaotic communication).

Carroll, Thomas L., "Communicationg with Use of Filtered, Synchronized Chaotic Signals", IEEE Transactions on Circuits and Systems I; Fundamental Theory and Applications, vool. 42, No. 3, pp. 105-110, Mar. 1995.

Dachselt, F., "Chaotic Coding and Cryptoanalysis", IEEE International Symposium on Circuits and Systems, Jun. 9-12, 1997, Hong Kong, pp. 1061-1064.

Ding, M. et al., "Enhancing Synchronism of Chaotic Systems," Physical Review E, vol. 49, No. 2, pp. R945-948, Feb. 1994.

Hayes, S., Grebogi, C., and Ott, E., "Communicating with Chaos", Phys. Rev. Lett., vol. 70, No. 20, pp. 3031-3034, May 17, 1993.

Hayes, S., Grebogi, C., and Ott, E., "Experimental Control of Chaos for Communication", Phys. Rev. Lett., vol. 73, No. 13, pp. 1781-1786, Sep. 1994.

Kavitha, V. et al., "Use of Chaotic Modeling for Transmission of EEG Data", International Conference on Information, Communications, and Signal Processing, ICIC '97, Singapore, Sep. 9-12, 1997, pp. 1262-1265.

Kruger, P. "Barbarian at the Gate?", Communications international, pp. 46-48, Jan. 1996.

Martienssen, W., "Chaotic Cryptology", Annalen der Physik, vol. 4, Issue 1, 1995, pp. 35-42.

Ott, E. et al., "Controlling Chaos", Physical Review Letters, vol. 64, No. 11, pp. 1196-1199, mar. 12, 1990.

Pecora et al., "Synchronization in Chaotic Systems", Physical Review Letters, vol. 64, No. 8, pp. 821-824, Feb. 19, 1990.###(ISR incorrectly cites No. 10, pp. 2374-2383).

Rossler, O. E., "An Equation for Continuous Chaos", Physics Letters A. vol. 57, No. 5, pp., 397-398, Jul. 12, 1976.

Shilnikov, "Mathematical Problems of Nonlinear Dynamics: A Tutorial", International Journal of Bifurcation and Chaos, vol. 7, No. 9, pp. 1953-2001, 1997.

Yang, T. et al., "Cryptanalyzing Chaotic Secure Communications Using Reture Map", Physics Letters A. vol.245, No.6, pp. 495-510, Aug. 31, 1998.###(ISR citation was incorrect and incomplete: No vol. No., no date, incorrect pp.).

Zhou, C., "Extracting Information Masked by Chaos and Contaminated with Noise: Some Considerations on Security of Communication Approaches Using Chaos", Physics Letters A, vol. 234, No. 6, pp. 429-435, Oct. 13, 1997.

Non-final office action issued by Examiner Jeffrey W. Donels on Dec. 17, 1999, in the prosecution of U.S. Appl. No. 09/437,565, now issued as U.S. Patent No. 6,137,045 (Method and apparatus for chaotic musical synthesis).

Carroll et al., "Synchronizing Chaotic System SPIE Chaos in Communications," 32-43, 1993.

Cuomo et al., "Synchronization of Lorenz-Based Chaotic Circuitw with Applications to Communications," IEEE Transactions on Circuits and Systems, 626-633, 1993.

Yang et al., Secure Communication via Chaotic Parameter Modulation IEEE Transactions on Circuits and Systems, 817-819.

Lai, Synchronization of a Chaotic Optical System Using Control SPIE Chaos in Communication, 91-102.

Ditto, Jul. 1997, Introduction: Control and Synchronization of Chaos, American Institute of Physics, vol. 7, No. 4, p. 5509-511.

* cited by examiner

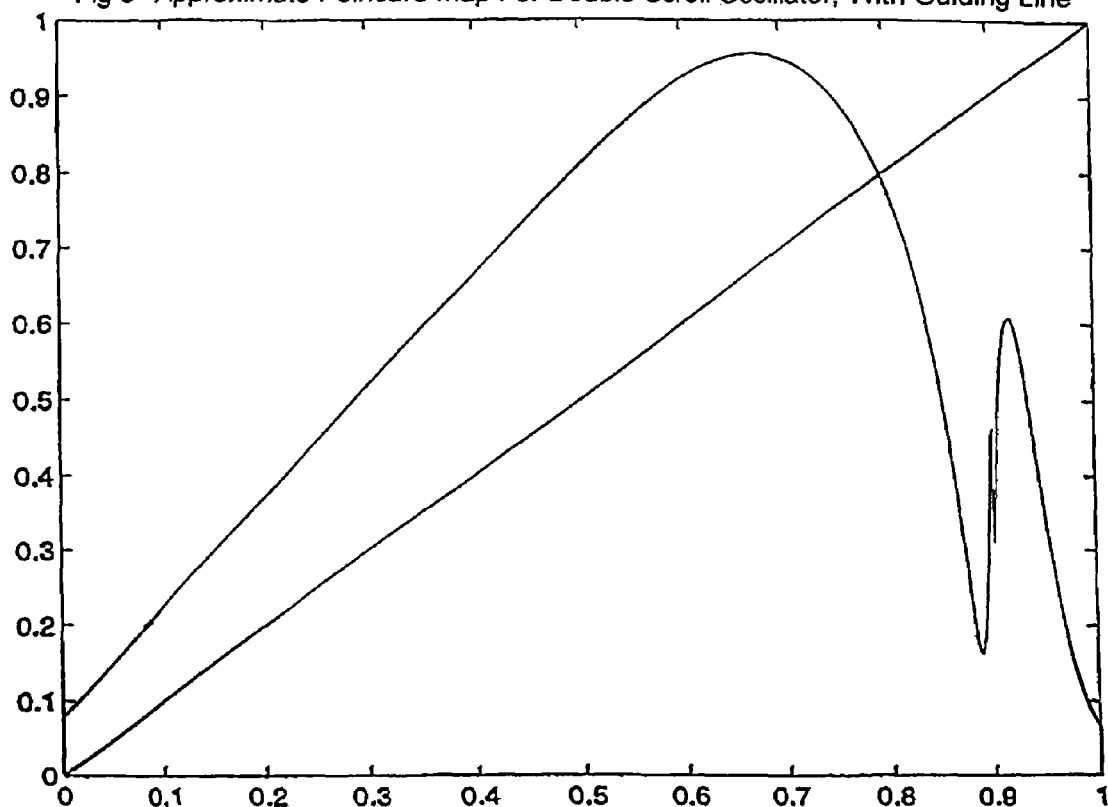
Fig 5 Approximate Poincare Map For Double-Scroll Oscillator, With Guiding Line

METHOD AND APPARATUS FOR REMOTE DIGITAL KEY GENERATION

This Application is a continuation of U.S. patent application Ser. No. 10/099,812, filed Mar. 18, 2002, which is a Continuation-In-Part of Short et al.—Method and Apparatus for Secure Digital Chaotic Communication—application Ser. No. 09/436,910 filed Nov. 9, 1999, each of which is hereby incorporated by reference herein in its entirety.

FIELD OF INVENTION

The present invention relates generally to a method and apparatus for the remote generation of a digital key to an encryption system. More specifically, it relates to a system for the remote generation of such a digital key through the use of chaotic systems.

BACKGROUND OF INVENTION

In many secure communication systems known to those skilled in the art, a key, or series of keys, are processed according to a given algorithm with a plain text to produce an encrypted text. It is assumed that the algorithm is well known. Thus, the security of the encrypted text is dependent on the security of the key.

It follows that the secure transmission of the key, from the party encrypting the plain text to the party decrypting the encrypted text, is of great importance. In many cases, the key is sent by means other than those used to send the encrypted text. Alternatively, the key itself is not transmitted, but some signal is transmitted by the encrypting party that allows for the remote generation of the key by the decrypting party. Chaotic systems can be used for the remote generation of a digital key.

In general, a chaotic system is a dynamical system which has no periodicity and the final state of which depends so sensitively on the system's precise initial state that its time-dependent path is, in effect, long-term unpredictable even though it is deterministic. Identical chaotic systems can be distributed in a secure manner to an encrypting party and a decrypting party. When the encrypting party desires to communicate a digital key to the decrypting party, a number of different systems can be used to cause the digital key to be generated remotely by the decrypting party without transmitting the digital key itself.

In one method, described in Short, et al—Method and Apparatus for Secure Digital Chaotic Communication—application Ser. No. 09/436,910 filed Nov. 9, 1999 and incorporated herein by reference ("Short et al.—Chaotic Communication"), a bitstream is selected by the encrypting party for use as a digital key and is then generated remotely by the decrypting party. Controls are intermittently applied by a transmitter-encoder to a chaotic system to generate a bitstream corresponding to the digital key. A control/no control bitstream is thereby created in which a 0 indicates that no control was applied and a 1 indicates that a control was applied. The control/no control bitstream and a prepended synchronization bitstream are transmitted to a receiver-decoder. An identical chaotic system in the receiver-decoder is driven into synchrony and is then subject to intermittent controls based on the control/no control bitstream, thereby causing the identical chaotic system to generate the digital key.

The method of the present invention does not start with the selection of a bitstream for use as a digital key. Instead, a chaotic system in an encryptor is allowed to generate an unpredictable bitstream, for use as a digital key, which bitstream is then also generated remotely at an identical chaotic system in a decryptor. An initialization code is sent by an encryptor to a chaotic system, which is then allowed to generate an unpredictable key bitstream. The same initialization code is sent to an identical chaotic system in a decryptor to drive that chaotic system into synchrony. The synchronized chaotic system is then allowed to generate a key bitstream, which is identical to the other key bitstream because the chaotic systems have been synchronized. The initialization code, if it is intercepted, cannot be used to reproduce either the key bitstream or the chaotic system.

SUMMARY OF THE INVENTION

An object of the present invention is to provide a new method and apparatus for remote digital key generation. Another object of the present invention is to provide a faster, more secure method and apparatus for remote digital key generation through the use of chaotic systems.

The present invention may be implemented either in hardware or software. An initialization code is sent to a first chaotic system that is then allowed to generate an unpredictable sequence of bits 0 and 1 for use as a digital key. The same initialization code is then sent to a second chaotic system, identical to the first chaotic system, to drive the second chaotic system into synchrony. The second chaotic system is then allowed to generate a sequence of bits 0 and 1, which is identical to the first sequence of bits because the two chaotic systems have been synchronized. Thus, a bitstream, suitable for use as a digital key, has been generated remotely, without the transmission of the digital key or any information from which the digital key or the chaotic system can be reconstructed.

The foregoing and other objects, features and advantages of the present invention will be apparent from the following more detailed description of preferred embodiments of the invention as illustrated in the accompanying drawings.

IN THE DRAWINGS

FIG. 5 is a plot of the Poincare Map for the given double scroll oscillator.

DETAILED DESCRIPTION OF THE INVENTION

The present invention is based on two important attributes of chaotic systems. The first such attribute is that the trajectory of a chaotic system will visit different regions of the system over time. If the different regions of the system are labeled 0 or 1, an unpredictable bitstream will be generated by the trajectory, as is described in more detail below. Alternatively, the different regions of the system may be labeled with any symbols, and the trajectory will generate an unpredictable string of such symbols. The string of symbols can then be converted to a bitstream according to an appropriate algorithm. For example, a string of letters and base 10 numbers can be converted using the ASCII algorithm. Controls can also be imposed on a chaotic system to cause it to generate a specific bitstream. The second such attribute is that certain controls may be used as initialization codes, as is also described in more detail below, to synchronize identical chaotic systems. The synchronized chaotic systems will then generate identical bitstreams.

In a preferred embodiment, such a chaotic system is a double-scroll oscillator [S. Hayes, C. Grebogi, and E. Ott, Communicating with Chaos, Phys, Rev. Lett. 70, 3031 (1993)], described by the differential equations $$C_1 \dot{v}_{C1} = G(v_{C2} - v_{C1}) - g(v_{C1})$$
$$C_2 \dot{v}_{C2} = G(v_{C1} - v_{C2}) + i_L$$
$$L \dot{i}_L = -v_{C2},$$

where $$g(v) = \begin{cases} m_1 v, & \text{if } -B_p \leq v \leq B_p; \\ m_0(v + B_p) - m_1 B_p, & \text{if } v \leq -B_p; \\ m_0(v - B_p) + m_1 B_p, & \text{if } v \geq B_p \end{cases}$$

Figure 3:
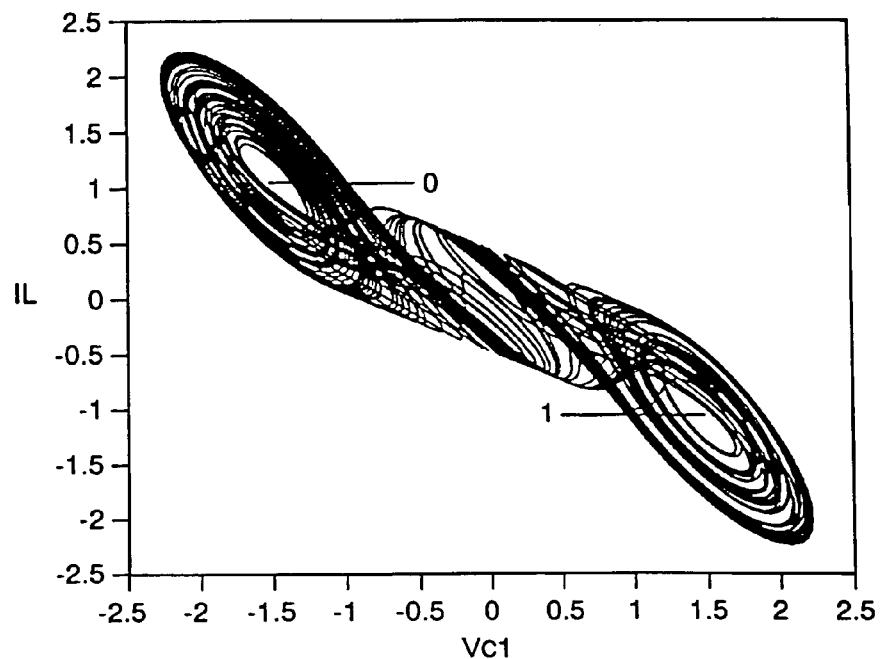
FIG. 3 is a plot of the double scroll oscillator resulting from the given differential equations and parameters.

The attractor that results from a numerical simulation using the parameters $C_1=1/9$, $C_2=1$, $L=1/7$, $G=0.7$, $m_0=-0.5$, $m_1=-0.8$, and $B_p=1$ has two lobes, which can be labeled $0$ and $1$, and each of which surrounds an unstable fixed point, as shown in FIG. 3.

Because of the chaotic nature of this oscillator's dynamics, it is possible to take advantage of sensitive dependence on initial conditions by carefully choosing small perturbations to direct trajectories around each of the loops of the attractor. In this way, a desired bit stream can be generated by steering the trajectories around the appropriate lobes of the attractor, suitably labeled $0$ and $1$. It should be noted that other embodiments could have more than two lobes, in which each lobe is labeled $0$ or $1$ or a symbol from any chosen symbol set.

Figure 4:
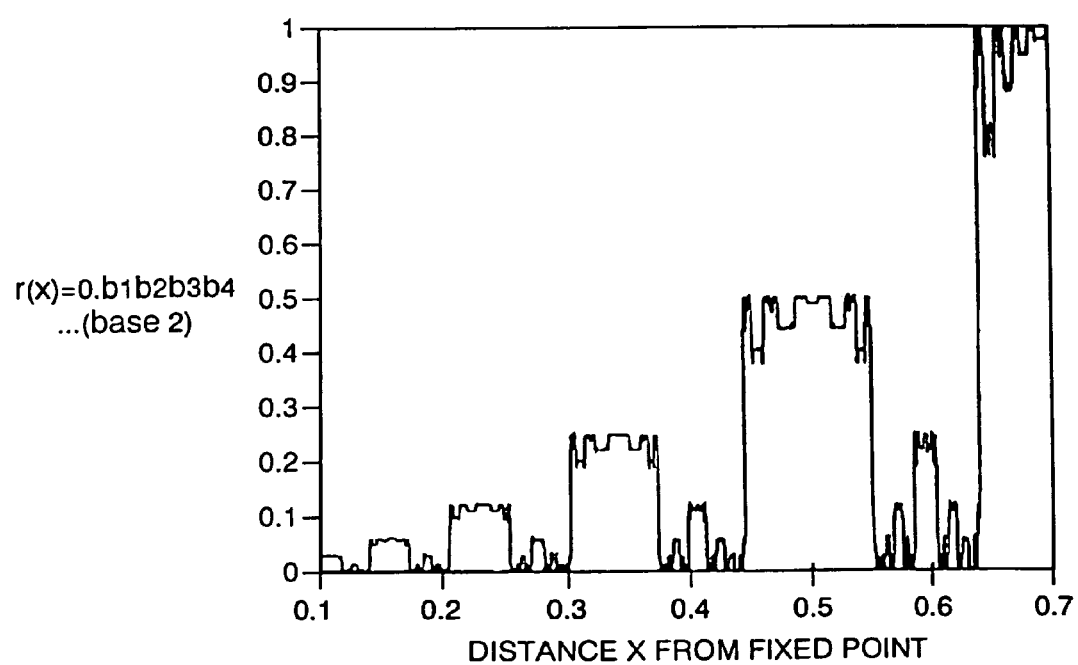
FIG. 4 is a plot of the symbolic dynamics function, r(x).

There are a number of means to control the chaotic oscillator in this preferred embodiment to specify the bits $0$ and $1$ more precisely. In a further preferred embodiment, a Poincare surface of section is defined on each lobe by intersecting the attractor with the half planes $i_L = \pm GF, |v_{C1}| \leq F$, where $F = B_p(m_0-m_1)/(G+m_0)$. When a trajectory intersects one of these sections, the corresponding bit can be recorded. Then, a function $r(x)$ is defined, which takes any point on either section and returns the future symbolic sequence for trajectories passing through that point. If $1_1, 1_2, 1_3, \ldots$ represent the lobes that are visited on the attractor (so $1_i$ is either a $0$ or a $1$), and the future evolution of a given point $x_0$ is such that $x_0 \rightarrow 1_1, 1_2, 1_3, \ldots, 1_N$ for some number N of loops around the attractor, then the function $r(x)$ is chosen to map $x_0$ to an associated binary fraction, so $r(x_0)=0.1_1 1_2 1_3 \ldots 1_N$, where this represents a binary decimal (base 2). Then, when $r(x)$ is calculated for every point on the cross-section, the future evolution of any point on the cross-section is known for N iterations. The resulting function is shown in FIG. 4, where $r(x)$ has been calculated for 12 loops around the attractor.

Control of the trajectory begins when it passes through one of the sections, say at $x_0$. The value of $r(x_0)$ yields the future symbolic sequence followed by the current trajectory for N loops. If generation of a desired bit stream requires a different symbol in the Nth position of the sequence, $r(x)$ can be searched for the nearest point on the section that will produce the desired symbolic sequence. The trajectory can be perturbed to this new point, and it continues to its next encounter with a surface. It should be noted that this embodiment exhibits a "limited grammar," which means that not all sequences of 0's and 1's can be directly encoded, because the chaotic oscillator always loops more than once around each lobe. Consequently, a sequence of bits such as 00100 is not in the grammar since it requires a single loop around the 1-lobe. A simple remedy is to repeat every bit in the code or append a 1- or 0-bit to each contiguous grouping of 1- or 0-bits, respectively. Other embodiments may have a different grammar, and examples exist where there are no restrictions on the sequence of 0's and 1's. For this system, the bitstream is read from the oscillation of coordinate $i_L$, so the bit stream is read from the peaks and valleys in $i_L$ (there are small loops/minor peaks that occur as the trajectory is switching lobes of the attractor, but these are ignored.)

The calculation of $r(x)$ in the preferred embodiment was done discretely by dividing up each of the cross-sections into 2001 partitions ("bins") and calculating the future evolution of the central point in the partition for up to 12 loops around the lobes. As an example, controls were applied so that effects of a perturbation to a trajectory would be evident after only 5 loops around the attractor. In addition to recording $r(x)$, a matrix M was constructed that contains the coordinates for the central points in the bins, as well as instructions concerning the controls at these points. These instructions simply tell how far to perturb the system when it is necessary to apply a control. For example, at an intersection of the trajectory with a cross-section, if $r(x_0)$ indicates that the trajectory will trace out the sequence 10001, and sequence 10000 is desired, then a search is made for the nearest bin to $x_0$ that will give this sequence, and this information is placed in M. (If the nearest bin is not unique, then there must be an agreement about which bin to take, for example, the bin farthest from the center of the loop.) Because the new starting point after a perturbation has a future evolution sequence that differs from the sequence followed by $x_0$ by at most the last bit, only two options need be considered at each intersection, control or no control.

The matrix M holds the information about which bin should hold the new starting point for the perturbed trajectory. In an analog hardware implementation of the preferred embodiment, the perturbations are applied using voltage changes or current surges; in a mapping-based hardware implementation, the perturbations are contained in a look-up table and would result in a variable replacement in the mapping function. In a software implementation of the preferred embodiment, the control matrix M would be stored along with the software computing the chaotic dynamics so that when a perturbation is required, the information would be read from M.

A further improvement involves the use of microcontrols. Each time a trajectory of a chaotic system passes through a cross-section, the simulation is backed-up one time step, and the roles of time and space are reversed in the Runge-Kutta solver so that the trajectory can be integrated exactly onto the cross-section without any interpolation. Then, at each intersection where no control is applied, the trajectory is reset so that it starts at the central point of whatever bin it is in. This resetting process can be considered the imposition of microcontrols. It removes any accumulation of round-off error and minimizes the effects of sensitive dependence on initial conditions. It also has the effect of restricting the dynamics to a finite subset of the full chaotic attractor although the dynamics still visit the full phase space. These restrictions can be relaxed by calculating $r(x)$ and M to greater precision at the outset.

Another embodiment of a chaotic system utilizes an approximate one-dimensional Poincare map. The Poincare section has two branches, one on each lobe of the attractor. The partitioning of the surface and the use of microcontrols allow one to calculate easily a map that exhibits all of the symbolic dynamics of the full microcontrolled system. The evaluation of this map is much simpler and faster than integrating between intersections with the surface of section. To find the map, one can take the center point in each bin as an initial condition (since these are the points to which the micro controls "reset" trajectories), integrate forward in time until the next intersection with either branch of the surface of section, and note the branch and bin in which the trajectory landed. For a given set of integration parameters (time step, method, etc.) and for a given partition of the surface of section, the trajectory from the center of any bin to its next intersection with the surface will not vary. Therefore, the map mimics exactly the behavior of the microcontrolled system for the given integration method.

To implement this map, two more columns are placed in the instruction matrix M: one containing the row number in M that corresponds to the next intersection for all 2001 bins, and the other containing the next lobe under the map. Simulated data transmission and reception using this new matrix is essentially the same as transmission and reception using integration. For a given bin on the section and for a given message bit, the transmitter-encoder still uses the function r(x) to compare the symbolic dynamics N bits in the future. If the N-th bit in the future dynamics for that bin differs from the current message bit, r(x) is used to find the nearest bin that will produce the desired sequence. Then the map is used to find the location of the next intersection with the surface, and the process is repeated with the next message bit. The use of this map eliminates time-consuming numerical integration, allowing for faster and more extensive processing.

The above map differs from a conventional Poincare map in a couple of aspects. First, while the Poincare section is two-dimensional, it is being approximated with a pair of lines extending from the unstable fixed points fitted with a least-squares method. Whenever a trajectory intersects the section, by only considering the distance from the corresponding fixed point, the point of intersection is essentially rotated about the fixed point onto the line before proceeding. Therefore the three-dimensional dynamical system is reduced to a one-dimensional map. Secondly, the point is reset to the center of its current bin to simulate the microcontrols. Theoretically, letting the maximum length of the intervals in the partition go to zero would make this second approximation unnecessary.

The use of a Poincare map allows a generalization of the system to any chaotic one-dimensional map. It is simply a matter of defining "lobes"—what section of the domain implies a switching of bits, recording the symbolic. dynamics in r(x) and finding appropriate controls as before. For example, one could take the logistics map $x_n = ax_{n-1}(1-x_{n-1})$ and somewhat arbitrarily say that for any $x_k$ x lobe, where $0 < x_{lobe} < 1$, the current bit $b_k$ will be $1 - b_{k-1}$:—otherwise, $b_k = b_{k-1}$. This gives the symbolic dynamics necessary to build a system, which can be improved in at least two ways. First, maps can be chosen that would have little to no grammar restriction, which would eliminate the need to adjust the bit stream to comply with the system's dynamics. Second, it is possible to fine-tune the maps to optimize the system statistically.

To eliminate the restriction that bits must at least come in pairs, it is necessary that the map allow trajectories to remain in the "switching" region for two or more iterations in a row. For example, one can use the second iterate of the logistics map, $x_n = a^2 x_{n-1}(1-x_{n-1})(1-ax_{n-1}(1-x_{n-1}))$, with a=3.99. To preserve the symmetry, it is logical to choose $x_{lobe} = 0.5$. All short N-bit words are possible in the natural evolution of this map, at least for N<4, so there are no grammar restrictions with this system.

The chaotic system in the preferred embodiment described above had two lobes, labeled 0 and 1. Other chaotic systems can have more than two labels, and each lobe can be labeled 0 or 1 so that a bitstream is generated as each such lobe is visited by the trajectory of the system. Alternatively, each lobe can be assigned a symbol from any chosen symbol set so that a symbol sequence is generated by the trajectory of the system. The string of symbols can be converted into a bistream according to an appropriate algorithm.

In another embodiment, starting with the chaotic system in the preferred embodiment described above, rather than labeling the lobes of the chaotic system, one can label the control bins on the control surfaces. The bins can be labeled 0 or 1, or each bin can be assigned a symbol from any chosen symbol set. Then a bitstream is generated by the trajectory of the chaotic system, as described above. The trajectory of a chaotic system can also be used in other ways to generate a bitstream. For example, using the chaotic system in the preferred embodiment described above, one can track the intersections of the trajectory with the control surfaces and compare the i-th intersection with the (i+1)-th intersection and use a distance measure between the bins in which the intersections occurred to form an information string, which can be converted to a bitstream. As another example, one can apply a threshold to the amplitudes of the oscillations of the trajectory. Whenever an oscillation is above the threshold, a 1-bit is generated and whenever an oscillator is below the threshold a 0-bit is generated, resulting in a bitstream.

A chaotic system, such as those described above in the various embodiments, can be driven into synchrony with an identical chaotic system by the use of an initialization code. It is possible to send an initialization code, consisting of a sequence of controls to each of the chaotic systems that will drive each of them onto the same periodic orbit. Once on the periodic orbit, an additional bit sent to it will cause it to leave the periodic orbit and generate a bitstream as described in detail above.

At a fundamental level, when microcontrols are used, there are only a finite number of orbits on a chaotic system, so periodicity of a chaotic system would eventually be guaranteed under a repeating sequence of controls. More importantly, a chaotic system can be driven onto a periodic orbit by sending it a repeating code. Different repeating codes lead to different periodic orbits. The periodic orbit reached is dependent only on the code segment that is repeated, and not on the initial state of the chaotic system (although the time to get on the periodic orbit can vary depending on the initial state). Consequently, it is possible to send an initialization code to two chaotic systems that drives them onto the same periodic orbit.

There are numerous control sequences that, when repeated, lead to a unique periodic orbit for all initial states, so that there is a one-to-one association between a sequence and the orbit. However, for some control sequences the orbits themselves change as the initial state of the chaotic system changes. Consequently, repeated control sequences can be divided into two classes, initializing codes and non-initializing codes. The length of each periodic orbit is an integer multiple of the length of the repeated control sequence. This is natural, since periodicity is attained only when both the current position on the cross-section as well as the current position in the control sequence is the same as at some previous time. To guarantee that the two chaotic systems are synchronized, it is sufficient that the period of the orbit is exactly the length of the smallest repeated segment of the initializing control sequence. Otherwise, it is possible that the two chaotic systems could be on the same periodic orbit, yet out of phase. Consequently, the chaotic systems would not be truly synchronized.

Chaotic systems can be implemented entirely in software. The chaotic systems in such an implementation are defined by a set of differential equations governing the chaotic dynamics, e.g., the double scroll equations described above. An algorithm is used to simulate the evolution of the differential equations, e.g., the fourth order Runge-Kutta algorithm. In a second software implementation, mappings instead of differential equations can be used to define the chaotic systems. In this case, the chaotic systems are defined to take an input value and produce an output value.

Chaotic systems can also be implemented in hardware. The chaotic systems are still defined by a set of differential equations, but these equations are then used to develop an electrical circuit that will generate the same chaotic dynamics. The procedure for conversion of a differential equation into an equivalent circuit is well-known and can be accomplished with operational amplifiers and multipliers, as well as other devices known to one skilled in the art, configured with the proper feedbacks. The control information is stored in a memory device, and controls are applied by increasing voltage or inducing small current surges in the circuit. In a second hardware implementation, a mapping function is converted into a look-up table that can be stored on a digital memory chip, along with a table containing the control information. A message is encoded by using the look-up table to generate the chaotic dynamics.

A chaotic system can also be implemented in lasers. In this implementation, a set of differential equations is approximated using optical devices. Once the approximate system is developed, it defines the chaotic systems, and then control surfaces, partitions and microcontrols are defined for the chaotic dynamics realized by the laser system. The laser is driven into a chaotic mode of oscillation, and controls are developed using, e.g. the occasional proportional feedback ("OPF") technique. [E. R. Hunt Phys. Rev. Lett. 67, 1953 (1991)]. The control information is stored in a memory device that contains information defining the required controls for both the full controls and the microcontrols, as described above. The microcontrols are applied by using, e.g., OPF controls to drive the chaotic dynamics toward the center of the partitions on the control surfaces.

Figure 1:
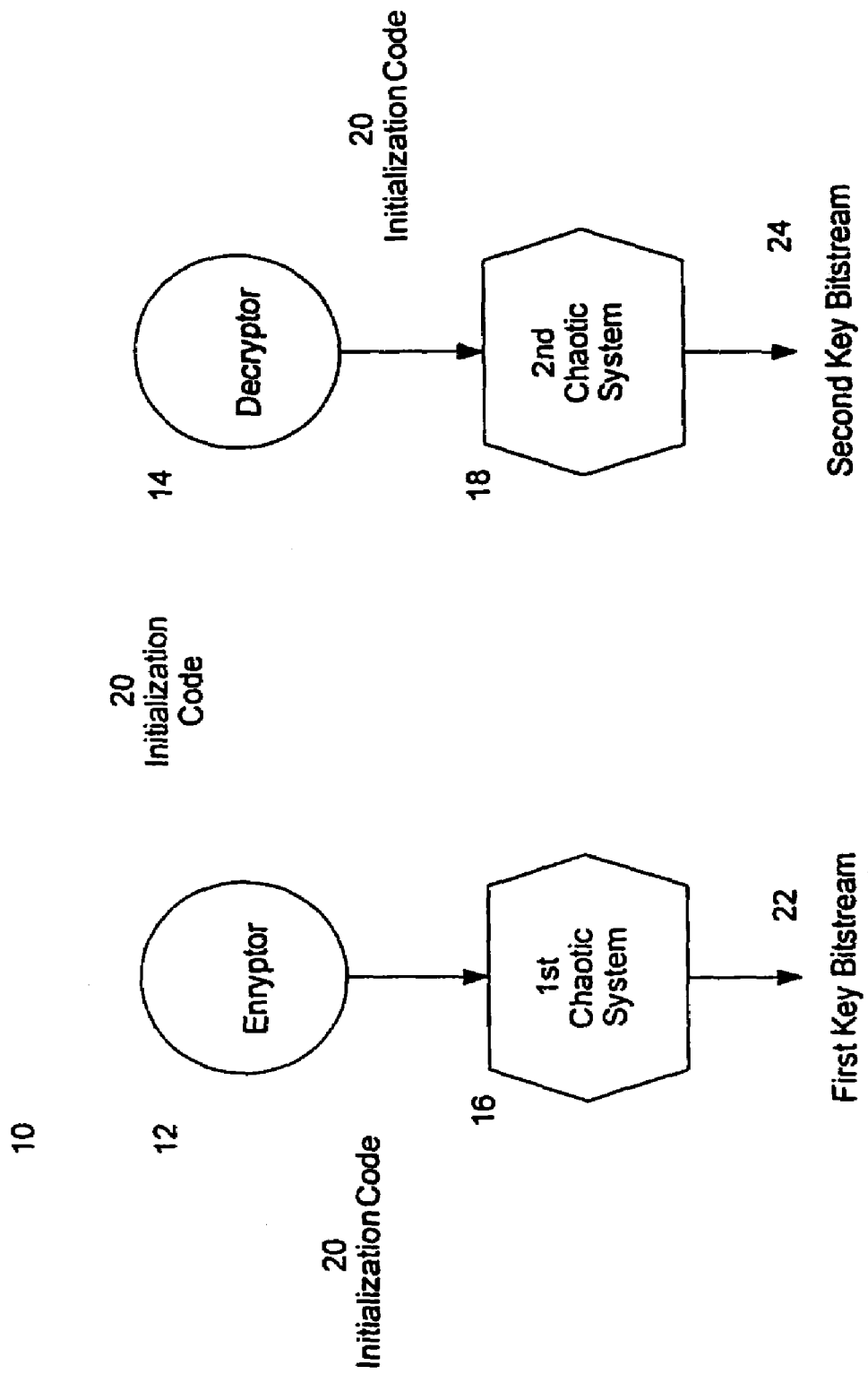
FIG. 1 is a block diagram of a remote digital key generation system according to an embodiment of the present invention.

Chaotic systems and initialization codes, preferred embodiments of both of which are described above, are used in a preferred embodiment of the present invention, as described in more detail below. FIG. 1 shows a remote digital key generating system 10 according to a preferred embodiment of the present invention. It comprises an encryptor 12 and a decryptor 14. It also comprises two identical chaotic systems, preferred embodiments of which are described above: a first chaotic system 16 and a second chaotic system 18. In operation, the encryptor 12 applies an initialization code 20, to the first chaotic system 16. The first chaotic system is allowed to generate an unpredictable first key bitstream 22 of desired length. The first key bitstream can be used as a digital key to encrypt a plain text message according to any of a number of encryption algorithms known to those skilled in the art. The encryptor 12 also sends the initialization code 20 to the decryptor 14 which applies the initialization code 20 to the second chaotic system 18. The second chaotic system 18 is then allowed to generate a second key bitstream 24, which second key bitstream 24 will be identical to the first key bitstream 22. The second key bitstream can be used as a digital key to decrypt text encrypted with the first key bitstream.

Figure 2:
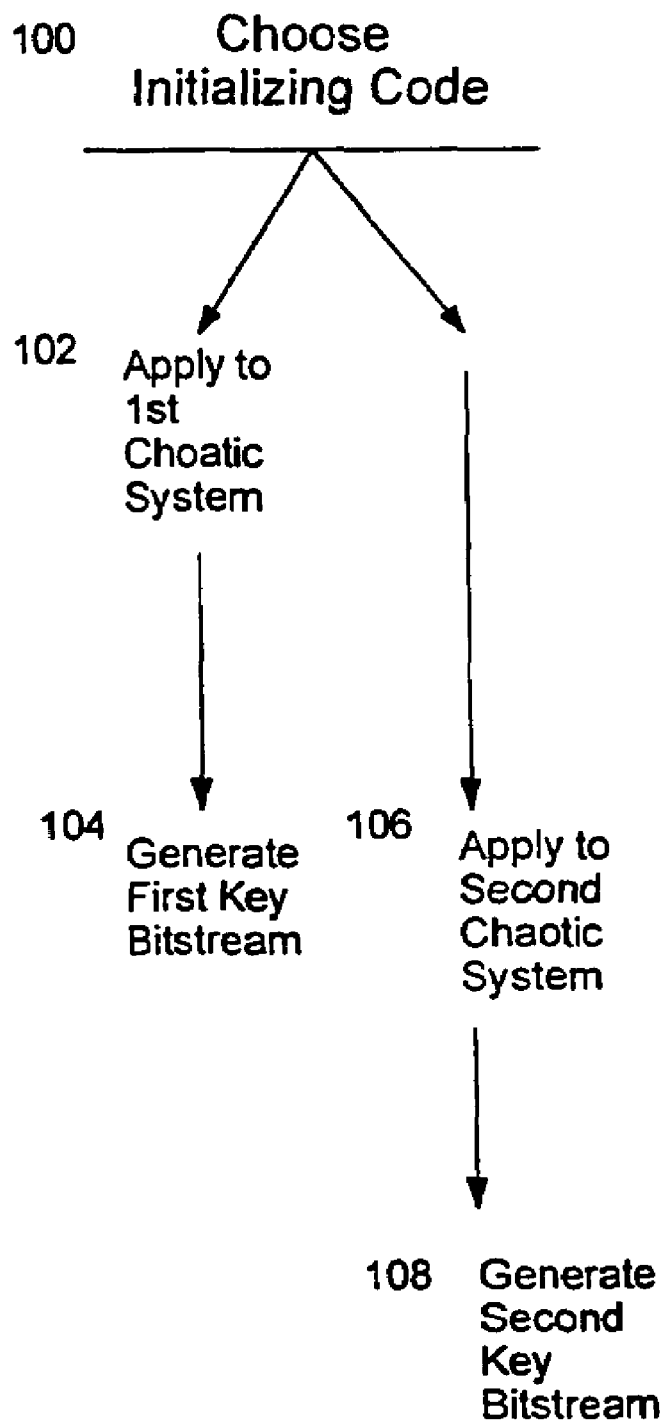
FIG. 2 is a flow chart showing the remote generation procedures of the remote digital key generation system shown in FIG. 1.

FIG. 2 is a flow chart of the remote digital key generation system of the present invention. In the first step 100, an initialization code, preferred embodiments of which are described above, is chosen. In step 102, the initialization code is applied to a first chaotic system to cause it to generate 104 an unpredictable first key bitstream of any desired length. The first key bitstream can be used as a digital key to encrypt a plain text message according to any of a number of encryption algorithms generally known in the art. The next step 106, which may occur before, at the same time, or after step 102, involves the application of the initialization code to a remote second chaotic system to cause it to generate 108 the second key bitstream, which is identical to the first key bitstream, and can be used to decrypt any message encrypted with the first key bitstream.

These are many different key-based encryption algorithms known to those skilled in the art. They all involve the transmission of a key to the decrypting party or, as in the present invention, the transmission of a signal to the decrypting party allowing that party to generate the key. For example, public key encryption uses a public key-private key pair. The public key is used to encrypt a message, and the private key must be transmitted to, or generated remotely by, the decrypting party for decryption. In the case of the so-called knapsack algorithm, the decrypting party must receive, or generate, a super increasing sequence of numbers as a key for decryption. The present invention can be used to generate remotely a digital key for use in any key-based encryption algorithm. In addition, a key can be generated by combining a bitstream produced by the present invention, a bitstream generated according to the method of Short, et al.—Chaotic Communication, and an encrypting party's PIN number. The bitstreams can be combined to produce a key through a modulo addition of the binary numbers or any other operation on the bits.

The invention has been particularly shown and described above with reference to various preferred embodiments implementations and applications. The invention is not limited, however, to the embodiments, implementations or applications described above, and modification thereto may be made within the scope of the invention.

What is claimed is:

1. A method of remote digital key generation, comprising:
providing a control sequence to a first chaotic system such that the control sequence drives the first chaotic system onto a first periodic orbit independent from the initial state of the first chaotic system;
allowing the first chaotic system to provide, at least in part based on the first periodic orbit, a first key bitstream; and
providing the control sequence to a second chaotic system, identical to the first chaotic system, to drive the second chaotic system onto the first periodic orbit independent from the initial state of the second chaotic system, thereby allowing the second chaotic system to provide the first key bitstream.

2. The method for remote digital key generation of claim 1 wherein the first chaotic system is created by a set of differential equations.

3. The method for remote digital key generation of claim 1 wherein the first chaotic system is created by a mapping function.

4. The method for remote digital key generation of claim 1 wherein the first chaotic system is created by an electrical circuit.

5. The method for remote digital key generation of claim 1 wherein the first chaotic system is created by a configuration of optical devices.

6. The method of claim 1, further comprising:
encrypting data using the first key bitstream provided by the first chaotic system; and
decrypting the encrypted data using the first key bitstream provided by second chaotic system.

7. The method of claim 1, wherein the first chaotic system has a trajectory that passes around at least two lobes and through several cross-sections.

8. The method of claim 7, wherein the control sequence influences the trajectory as the trajectory passes through at least one of the several cross-sections.

9. A system for remote digital key generation, comprising:
an encryptor for providing a control sequence to a first chaotic system such that the control sequence drives the first chaotic system onto a first periodic orbit independent from the initial state of the first chaotic system, for allowing the first chaotic system to provide, at least in part based on the first periodic orbit, a first key bitstream, and for providing the control sequence to a decryptor; and
the decryptor for providing the control sequence to a second chaotic system, identical to the first chaotic system, to drive the second chaotic system onto the first periodic orbit independent from the initial state of the second chaotic system, thereby allowing the second chaotic system to provide the first key bitstream.

10. The system for remote digital key generation of claim 9 wherein the first chaotic system is created by a set of differential equations.

11. The system for remote digital key generation of claim 9 wherein the first chaotic system is created by a mapping function.

12. The system for remote digital key generation of claim 9 wherein the first chaotic system is created by an electrical circuit.

13. The system for remote digital key generation of claim 9 wherein the first chaotic system is created by a configuration of optical devices.

14. The system of claim 9, wherein the encryptor encrypts data using the first key bitstream provided by the first chaotic system and the decryptor decrypts the encrypted data using the first key bitstream provided by the first chaotic system.

* * * * *